(12) United States Patent
Le et al.

(10) Patent No.: US 8,219,287 B2
(45) Date of Patent: Jul. 10, 2012

(54) SYSTEM AND METHOD FOR INTEGRATION OF CRASH SIGNATURE SENSOR IN VEHICLE SIDE IMPACT SENSING

(75) Inventors: Jialiang Le, Canton, MI (US); Paul Simmons, Chesterfield, MI (US); Manoharprasad K. Rao, Novi, MI (US); Clifford C. Chou, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 979 days.

(21) Appl. No.: 12/056,767

(22) Filed: Mar. 27, 2008

(65) Prior Publication Data
US 2009/0248253 A1 Oct. 1, 2009

(51) Int. Cl.
*B60R 21/013* (2006.01)
(52) U.S. Cl. .......................................... 701/47; 280/735
(58) Field of Classification Search .................. 701/45, 701/47; 280/735; 73/862.59
See application file for complete search history.

(56) References Cited

U.S. PATENT DOCUMENTS

| | | | |
|---|---|---|---|
| 5,748,075 A | 5/1998 | Dirmeyer et al. | |
| 6,157,880 A * | 12/2000 | de Mersseman et al. | 701/45 |
| 6,209,909 B1 | 4/2001 | Breed | |
| 6,487,482 B1 * | 11/2002 | Mattes et al. | 701/45 |
| 6,678,599 B2 * | 1/2004 | Eisele et al. | 701/45 |
| 6,917,866 B2 | 7/2005 | Grotendiek et al. | |
| 7,098,778 B1 * | 8/2006 | Zoratti et al. | 340/436 |
| 7,484,756 B2 * | 2/2009 | Le et al. | 280/735 |
| 7,541,917 B2 * | 6/2009 | Hosokawa | 340/436 |
| 7,556,116 B2 * | 7/2009 | Ootani et al. | 180/274 |
| 7,653,468 B2 * | 1/2010 | Wellhoefer et al. | 701/46 |
| 7,774,116 B2 * | 8/2010 | Brandmeier et al. | 701/47 |
| 2005/0041529 A1 | 2/2005 | Schliep et al. | |
| 2005/0041819 A1 | 2/2005 | Brown | |
| 2005/0067821 A1 * | 3/2005 | Reimer et al. | 280/735 |
| 2005/0209756 A1 * | 9/2005 | Ueno | 701/45 |
| 2005/0278098 A1 | 12/2005 | Breed | |
| 2006/0097495 A1 | 5/2006 | Stuetzler | |
| 2006/0235593 A1 * | 10/2006 | Mayumi | 701/45 |
| 2006/0241834 A1 | 10/2006 | Kithil | |
| 2006/0244245 A1 * | 11/2006 | Nonaka et al. | 280/735 |

OTHER PUBLICATIONS

Feser et al., Advanced Crash Discrimination using Crash Impact Sound Sensing (CISS), SAE Technical Paper Series 2006-01-1590, Apr. 3-6, 2006, 9 pages.

* cited by examiner

*Primary Examiner* — Joseph Rocca
*Assistant Examiner* — Timothy Wilhelm
(74) *Attorney, Agent, or Firm* — Brooks Kushman P.C.

(57) ABSTRACT

A system and method for performing side impact sensing in a vehicle including at least one side impact zone is provided. The system comprises a controller and at least one crash signature sensor. The controller is configured to deploy one or more safety restraints in response to at least one crash signature signal. The one crash signature sensor is positioned in the side impact zone. The crash signature sensor is configured to detect an impact with an object at the side impact zone. The crash signature sensor is further configured to generate the crash signature signal which corresponds to measured structural impact energy of the vehicle in the side impact zone deformed by the impact at frequencies above 2 kHz.

15 Claims, 4 Drawing Sheets

SYSTEM AND METHOD FOR INTEGRATION OF CRASH SIGNATURE SENSOR IN VEHICLE SIDE IMPACT SENSING

BACKGROUND

1. Technical Field

The embodiments of the present invention described herein generally relate to a system and method for vehicle side impact sensing.

2. Background Art

A cursory examination of the National Highway Transportation Safety Administration (NHTSA) crash database reveals that side accidents can occur under a large variety of circumstances and conditions. The NHTSA crash database also indicates that a large percentage of injuries and fatalities occur due to vehicle side impacts. Such injuries and fatalities due to vehicle side impacts fall just behind frontal impacts which are the leading cause of injuries and fatalities. The majority of accidents that occur for vehicle side impacts include a bullet vehicle smash of the side door of a host vehicle, or the slipping of the host vehicle which contacts a pole.

Recently, automakers have introduced advanced restraint systems for side impact protection. Side sensing algorithms incorporated within such advanced restraint systems are key in detecting the occurrence of a side impact. The restraint system deploys restraint devices for occupant protection in response to the side sensing algorithms detecting side impacts. Accordingly, it is beneficial to improve side sensing algorithms to detect side impact for early deployment of restraint systems for occupant safety.

SUMMARY

In at least one embodiment of the present invention, a system for performing side impact sensing in a vehicle including at least one side impact zone is provided. The system comprises a controller and at least one crash signature sensor. The controller is configured to deploy one or more safety restraints in response to at least one crash signature signal. The one crash signature sensor is positioned in the side impact zone. The side impact zone is a part of a vehicle side structure that is disposed about at least one of a first row occupant seating arrangement and a second row seating arrangement of the vehicle. The crash signature sensor is configured to detect an impact with an object at the side impact zone. The crash signature sensor is further configured to generate the crash signature signal which corresponds to measured structural impact energy of the vehicle in the side impact zone deformed by the impact at frequencies above 2 kHz.

In at least one embodiment of the present invention, a method for performing side impact sensing in a vehicle that includes at least one side impact zone is provided. The method includes deploying one or more safety restraints in response to at least one crash signature signal and positioning the at least one crash signature sensor in the side impact zone. The side impact zone is part of a vehicle side structure that is disposed about at least one of a first row occupant seating arrangement and a second row occupant seating arrangement of the vehicle. The method further includes detecting an impact at the side impact zone with the crash signature sensor and generating the crash signature signal which corresponds to measured structural impact energy of the vehicle in the impact zone deformed by the impact at frequencies above 2 kHz with the crash signature sensor.

In at least one embodiment of the present invention, a sensor assembly for detecting a side impact in a vehicle is provided. The sensor assembly comprises at least one crash signature sensor positioned in a side impact zone. The side impact zone is part of a vehicle side structure that is disposed about at least one of a first row occupant seating arrangement and a second row occupant seating arrangement of the vehicle. The crash signature sensor is configured to detect impact with an object about the at least one first and second row occupant seating arrangements of the vehicle. The crash signature sensor is further configured to transmit the crash signature signal to a controller for deploying one or more safety restraints in response to the impact. The crash signature signal corresponds to measured structural impact energy of the vehicle at frequencies above 2 kHz.

DETAILED DESCRIPTION

Figure 1:
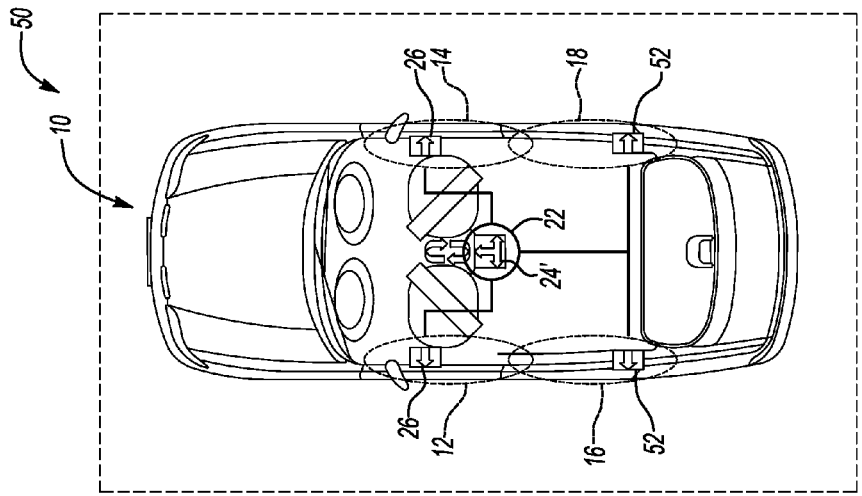
FIG. 1 depicts a conventional system for detecting side impacts in a vehicle.

FIG. 1 depicts a vehicle 10 having a system 20 for detecting side impacts. The vehicle 10 may be divided into various zones 12, 14, 16 and 18. Such zones 12, 14, 16 and 18 may be defined as side impact zones. In general, the side impact zone 12, 14, 16 and 18 generally include portions of the vehicle side structure disposed about first and second row occupant seating configurations of the vehicle 10. Larger vehicles may have side impact zones at vehicle side structures disposed about third and forth row occupant seating configurations. One or more of the zones 12, 14, 16, and 18 of the vehicle 10 may experience a side impact with an object. The object may be another vehicle, a pole, a tree, or other such hard item. Zone 12 generally includes portions of the vehicle (both external and internal vehicle components) positioned about a front driver section of the vehicle 10. Zone 14 generally includes portions of the vehicle (both external and internal vehicle components) positioned about a front passenger section of the vehicle 10. Zone 16 generally includes portions of the vehicle (both external and internal vehicle components) positioned about a left side rear passenger section of the vehicle 10. Zone 18 generally includes portions of the vehicle (both external and internal vehicle components) positioned about a right side rear passenger section of the vehicle 10. The system 20 includes a passive safety controller 22 and a plurality of passive safety sensors. The passive safety controller 22 is positioned about the center of the vehicle 10 between zones 12 and 14 and zones 16 and 18.

The passive safety sensors generally comprise at least one accelerometer sensor 24. The system 20 illustrates that the accelerometer sensor 24 may be positioned in each zone 12, 14, 16 and 18. An accelerometer sensor 24' may be integrated with the passive safety controller 22. With respect to the zones 12, 14, 16 and 18, the accelerometer sensor 24 is generally mounted to a side structural member of the vehicle 10 such as a rocker, and B and C pillars on both sides of the vehicle. The accelerometer sensors 24 are configured to measure the acceleration of the vehicle side structure (such as the rocker and B-C pillars in the zones 12, 14, 16 and 18) in the event one or more of the zones 12, 14, 16 and 18 encounters an impact with an object.

The accelerometer sensors 24 positioned in zones 12, 14, 16 and 18 and the accelerometer sensor 24' positioned within the passive safety controller 22 are each adapted to transmit acceleration signals to the passive safety controller 22. The accelerometer sensor 24 and the accelerometer sensor 24' transmit the acceleration signals in response to detecting the movement of the corresponding structural members in zones 12, 14, 16 and 18 and at the location in which the passive safety controller 22 is located as the vehicle experiences a side impact. During vehicle side impact, the passive safety controller 22 monitors the acceleration signal transmitted by each accelerometer sensor 24 in each zone 12, 14, 16 and 18 and the acceleration signal generated by the accelerometer sensor 24'. The passive safety controller 22 monitors for vehicle acceleration and/or deceleration based on the acceleration signal transmitted by the accelerometer sensor 24 and the accelerometer sensor 24' prior to deploying airbags or other such related safety features in the restraint system. The acceleration sensors 24 are adapted to measure acceleration and deceleration of the vehicle structure deformed by the impact.

The passive safety controller 22 determines the direction of the oncoming object with respect to the vehicle 10 based on information provided by the accelerometer sensors 24 in the zones 12, 14, 16 and 18 in the event a side impact takes place. If the passive safety controller 22 receives the acceleration signal from any one or more of the accelerometers sensors 24 in the zones 12, 14, 16 and 18; the passive safety controller 22 determines that the impact direction of the object that impacts the zones 12, 14, 16 and 18 of the vehicle 10 is lateral (e.g., y-axis of the vehicle which is defined as the axis extending from the passenger's side of the vehicle 10 to the driver's side of the vehicle 10). The acceleration signal generated by accelerometer sensor 24' integrated within the passive safety controller 22 serves as a reference signal having reference acceleration values. The reference acceleration values are compared to threshold values and the acceleration signals received from the accelerometer sensors 24 in zones 12, 14, 16 and 18 to assess the intensity levels of the impact and to determine when it may be necessary to deploy various safety related features in the restraint system.

Figure 2:
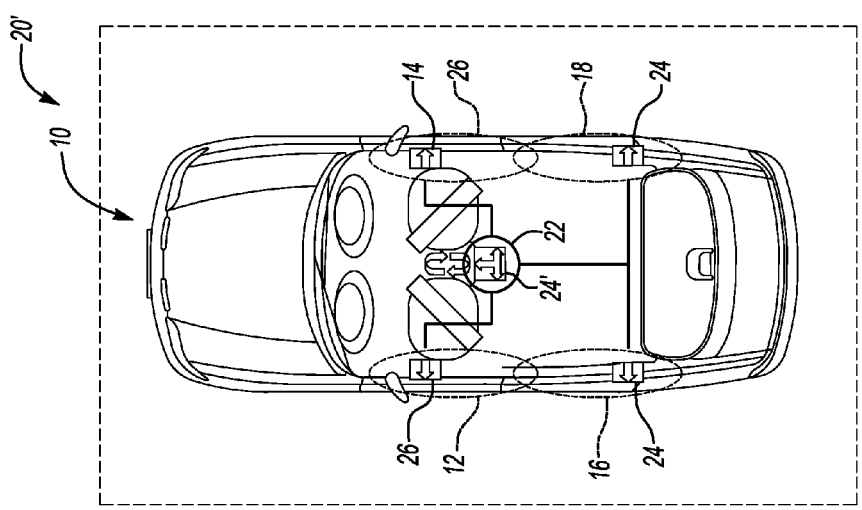
FIG. 2 depicts another conventional system for detecting side impacts in a vehicle.

FIG. 2 depicts a vehicle 10 having a system 20' for detecting side impacts. The system 20' is generally similar to the system 20 of FIG. 1, however, the system 20' comprises a pressure sensor 26 positioned in zones 12 and 14. The pressure sensors 26 are positioned in door well cavities and measure a pressure change in the door cavity. Such a pressure change in the door cavity of the vehicle 10 may be caused by the vehicle experiencing a side impact. Each pressure sensor 26 may transmit a pressure signal to the passive safety controller 22 based on which zone 12 or 14 experiences the side impact. The pressure sensors 26 provide the location of the impact (e.g., impact at zone 12 or 14) and the direction of the oncoming object (e.g., lateral). The passive safety controller 22 monitors the pressure changes in the door cavities via the pressure sensors 26, in the event the vehicle sustains an impact in either or both zones 12 or 14 prior to deploying airbags or other such safety related features in the restraint system. If the passive safety controller 22 receives a pressure signal from both or either of the pressure sensors 26 in zones 12 and 14 which exceeds predetermined pressure threshold values and the lateral acceleration/deceleration of the vehicle is greater than the reference signal and other such signals used for plausibility purposes, the passive safety controller 22 may deploy the airbags or other safety related features in the restraint system. In some cases, the system 20' may improve performance of side impact detection over the system 20. While the system 20' generally provides for a useful side impact detection system, an upgrade in performance over the systems 20 and 20' is desirable for further safety enhancements for occupants seated in the second row of the vehicle. Enhanced protection for second row occupants may require a better differentiation of crash signals between deploy and non-deploy situations at the second row of the vehicle in the event the vehicle sustains a side impact.

Figure 3:
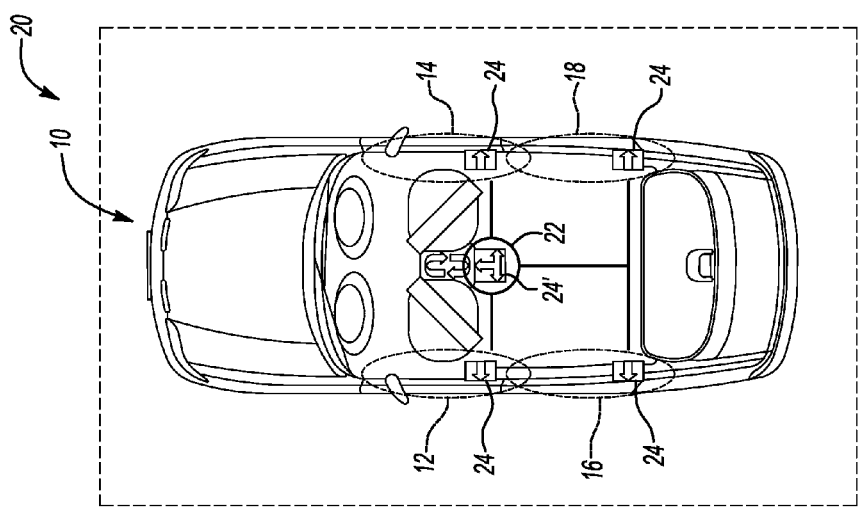
FIG. 3 depicts a system for detecting side impacts for a vehicle in accordance to an embodiment of the present invention.

FIG. 3 depicts a system 50 for detecting side impacts for a vehicle in accordance to an embodiment of the present invention. The system 50 generally includes the zones 12, 14, 16 and 18 as noted in connection with systems 20 and 20'. Each zone 16, 18 generally includes a crash signature sensor 52 for detecting a vehicle side impact. The crash signature sensors 52 are used along with the pressure sensors 26 for side impact detection. The crash signature sensors 52 are mounted to the side structure of the vehicle and disposed about second row occupant seating locations of the vehicle (e.g., positioned about zones 16 and 18). In one example, the crash signature sensors 52 may be mounted to the C-Pillars of the vehicle. In general, the crash signature sensors 52 may provide for a better differentiated transmission of crash signals than the signals generated by accelerometer sensors 24. The crash signature sensors 52 are generally configured to sense high frequency structural impact energy and generate crash signature signals. The crash signature sensor 52 may measure band-pass frequency components of the structural impact energy. In one example, the crash signature sensor 52 measures band-pass frequency components of the structural impact energy in the frequency range of 2 kHz to 20 kHz. In contrast, the accelerometer sensor 24 may measure the structural impact energy at low pass frequency components. For example, such low pass frequencies may be less than 400 Hz. The crash signature sensor 52 may measure the band-pass frequency components of impact energy that is released from portions of the vehicle which correspond to second row occupants seating locations. For example, the crash signature sensor 52 may measure band-pass frequency components near or proximate to the C-pillar which undergoes deformation in the event any of the portions of the vehicle about the C-pillar (including the C-pillar) is impacted in a collision. The passive safety controller 22 may determine crash severity, crash mode and crash location with the crash signature signals transmitted by the crash signature sensor 52. The high frequency measurement characteristic of the crash signature sensor 52 generally provides for a signal which may be easier to discern than the low frequency measurement characteristic of the accelerometer sensor 24.

Figure 4A:
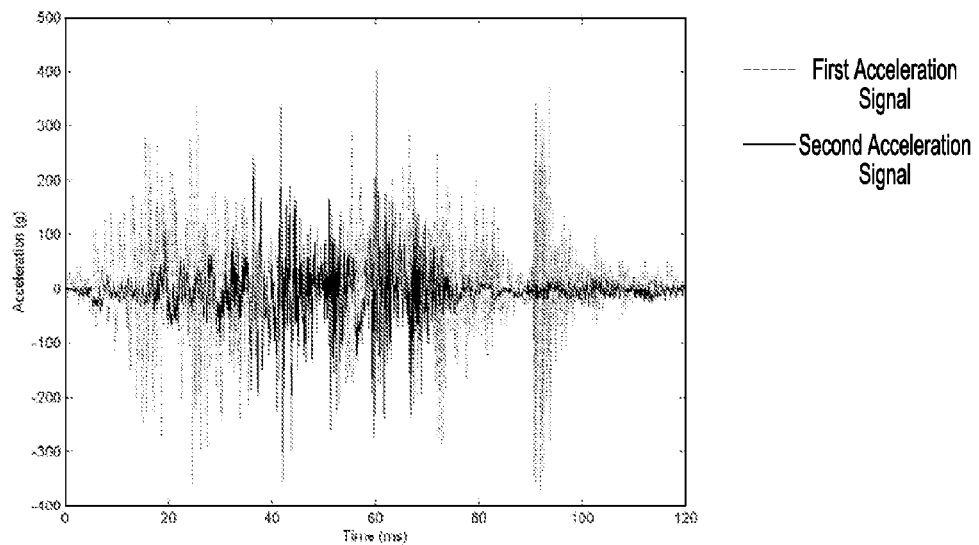
FIGS. 4A-4B depict acceleration and crash signature signals for a restraints deploy collision event and a restraints non-deploy collision event.

FIG. 4A depicts a plot for first and second acceleration signals for a restraints deploy collision event and a restraints non-deploy collision event, respectively. The first acceleration signal corresponds to a signal transmitted by an accelerometer sensor while the vehicle is in a deploy collision event. The first acceleration signal transmits higher g-values (or accelerations values) while the vehicle is in the restraint deploy collision event. The second acceleration signal corresponds to a signal transmitted by an accelerometer sensor while the vehicle is in a non-deploy collision event. The second acceleration signal transmitted during the non-deploy collision event provides lower g-values. For enhanced occupant protection during side impacts, it may be advantageous to make a restraint deploy decision at an early stage, for example, within 10 ms from the initial contact. In some cases, such an early deployment decision may be possible with accelerometer sensors (e.g., sensors that measure impact energy at a low frequency). However, in some cases it may be difficult to reach an early deployment decision with the accelerometer sensors as illustrated by FIG. 4a.

Figure 4B:
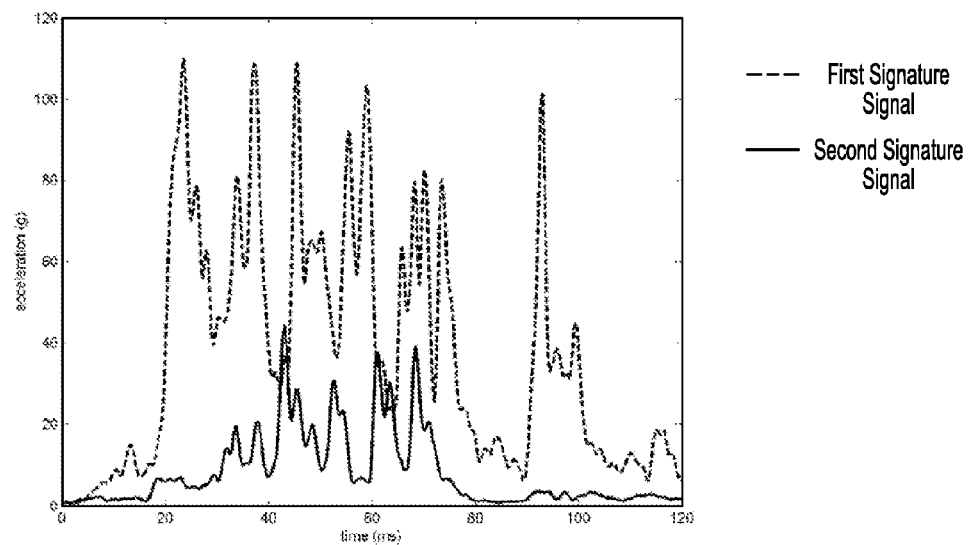

FIG. 4B is a plot depicting first and second crash signature signals for a restraint deploy and a non-deploy collision event, respectively. The first crash signature signal contains higher g-values (or accelerations values) as the vehicle undergoes a deploy event. The second crash signature signal contains lower g-values while the vehicle is involved in a non-deploy collision event. The first and second crash signature signals as depicted in FIG. 4B generally contain a significant margin of differentiation for the passive safety controller 22 to distinguish between a deploy and non-deploy collision event. In addition, the first and second crash signature signals exhibit a faster response time for an earlier restraint deployment decision (due to the high frequency ranges in which they operate) when compared to the first and second acceleration signals of FIG. 4A which generally operate at a frequency below 400 HZ.

Figure 5:
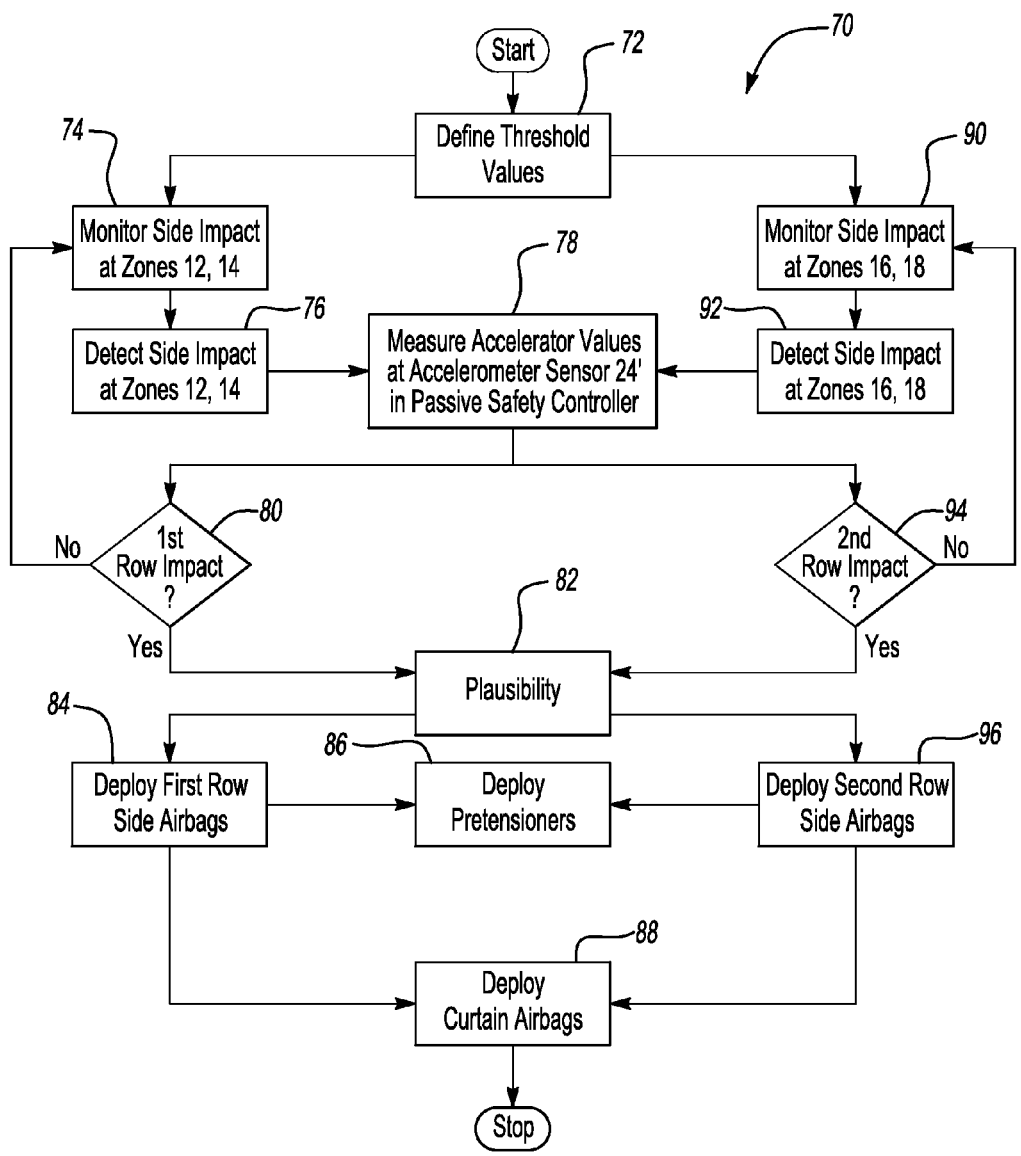
FIG. 5 depicts a block diagram for detecting side impacts for a vehicle.

FIG. 5 depicts a block diagram 70 for detecting side impacts for a vehicle with the crash signature sensor 52. In block 72, the passive safety controller 22 defines threshold values which may need to be exceeded to detect a vehicle side impact for the pressure signals, the crash signature signals and/or the acceleration signals. The threshold values may be in the form of pressure values, crash signature values (e.g. band-pass frequency acceleration values (e.g., between 2 and 20 kHz)), and acceleration values (e.g. low frequency acceleration values (e.g., between 0 and 400 Hz)). A look up table in the passive safety controller 22 stores the threshold values.

In block 74, the passive safety controller 22 monitors for a side impact at zones 12 and/or 14 (e.g., the first row of the vehicle). The pressure sensors 26 are used in the zones 12 and 14 to detect a side impact.

In block 76, the pressure sensor 26 in zones 12 and/or 14 detects a side impact in the lateral direction and transmits measured pressure values to the passive safety controller 22.

In block 78, the accelerometer sensor 24' integrated within the passive safety controller 22 generates measured acceleration values during the side impact.

In block 80, the passive safety controller 22 determines whether zones 12, 14 sustained a side impact. For example, the passive safety controller 22 compares the measured pressure values against the threshold values in the look up table to determine if a vehicle side impact occurred at zones 12 and/or 14. If the measured pressure values exceed the threshold pressure values, the passive safety controller 22 determines that a first row side impact occurred. In addition to the passive safety controller 22 determining the location of the impact based on the measured pressure values, the passive safety controller 22 may assess crash severity and determine the direction of the object that impacts the vehicle with the measured pressure values. If the passive safety controller 22 determines that a side impact occurred at zone 12 or 14, the diagram 70 moves to block 82. If the passive safety controller 22 does not determine that a side impact occurred at zones 12 and/or 14, then the diagram 70 moves to block 74.

In block 82, the passive safety controller 22 performs plausibility prior to deploying a restraint system. For example, the passive safety controller 22 uses the measured acceleration values generated from the acceleration sensor 24' positioned within the passive safety controller 22 and measured crash signature values generated from the crash signature sensors 52 at zones 16, 18 to confirm that an impact occurred. In addition, the passive safety controller 22 may also use measured acceleration values generated from additional accelerometer sensors (not shown in FIG. 3) positioned within the vehicle. For example, the vehicle 10 may include one or more accelerometer sensors positioned at the front of the vehicle to detect the impact location and impact severity for frontal collisions. The vehicle may also include one or more accelerometer sensors positioned at the rear of the vehicle to detect the impact location and impact severity for rear collisions. In each case, the accelerometer sensors positioned at the front and rear of the vehicle may each transmit measured acceleration values as the side impact occurs. In such a case, the passive safety controller 22 receives measured acceleration values from the accelerometer sensor 24' and the accelerometer sensors positioned at the front and rear of the vehicle. The passive safety controller 22 cross-checks the measured acceleration values received from the accelerometer sensor 24' and the accelerometer sensors positioned at the front of the vehicle along with the measured crash signature values generated by the crash signature sensor 52 to confirm the occurrence of an impact prior to deploying the restraint system.

In block 84, the passive safety controller 22 deploys side airbags to protect occupants seated in the first row seats from the side impact.

In block 86, the passive safety controller 22 deploys motorized seatbelt pretensioners for occupants seated in the first row.

In block 88, the passive safety controller 22 deploys side curtain airbags to protect occupants seated in the first row. A single side curtain airbag may cover both first and second row seats and offer side impact protection to upper body regions of occupants seated in the first and second rows.

In block 90, the passive safety controller 22 monitors for a side impact at zones 16 and/or 18 (e.g., the second row of the vehicle). The crash signature sensors 52 are used in the zones 16 and 18 to detect a side impact.

In block 92, the crash signature sensor 52 in zones 16 and/or 18 detects a side impact in the lateral direction and transmits measured crash signature values to the passive safety controller 22.

In block 78, the accelerometer sensor 24' integrated within the passive safety controller 22 generates the measured acceleration values during the side impact.

In block 94, the passive safety controller 22 determines whether zones 16, 18 sustained a side impact. For example, the passive safety controller 22 compares the measured crash signature values against the crash signature threshold values in the look up table to determine if a vehicle side impact occurred at zones 16 and/or 18. If the measured crash signature values exceed the threshold crash signature values, the passive safety controller 22 determines that a second row side impact has occurred. In addition to the passive safety controller 22 determining the location of the impact based on the measured crash signature values, the passive safety controller 22 may assess crash severity and determine the direction of the object that impacts the vehicle with the measured crash signature values. If the passive safety controller 22 determines that a side impact occurred at zone 16 or 18, the diagram 70 moves to block 82. If the passive safety controller 22 does not determine that a side impact occurred at zones 16 and/or 18, then the diagram moves to block 90.

In block 82, the passive safety controller 22 performs plausibility prior to deploying a restraint system. For example, the passive safety controller 22 uses the measured acceleration values generated from the acceleration sensor 24' positioned within the passive safety controller 22 and measured pressure values from the pressure sensors 26 to confirm that an impact occurred. In addition, the passive safety controller 22 may also use measured acceleration values generated from additional accelerometer sensors positioned within the vehicle. As noted above, the vehicle 10 may include one or more acceleration sensors positioned at the front of the vehicle to detect the impact location and impact severity for frontal collisions. The vehicle may also include one or more accelerometer sensors positioned at the rear of the vehicle to detect the impact location and impact severity for rear collisions. In each case, the accelerometer sensors positioned at the front and rear of the vehicle may each transmit measured acceleration values as the side impact occurs. In such a case, the passive safety controller 22 receives measured acceleration values from the accelerometer sensor 24' and the accelerometer sensors positioned at the front and rear of the vehicle. The passive safety controller 22 cross-checks the measured acceleration values received from the accelerometer sensor 24' against the measured acceleration values received from the accelerometer sensors positioned at the front of the vehicle to confirm the occurrence of an impact prior to deploying the restraint system. In addition, the passive safety controller 22 cross-checks the measured pressure values received from the pressure sensors 26 against the measured acceleration values to confirm the occurrence of an impact.

In block 96, the passive safety controller 22 deploys second row side airbags to protect occupants seated in the second row, if the vehicle is equipped with second row side airbags. From block 96 the diagram 70 moves to block 86 and block 88. In block 86, the passive safety controller 22 deploys motorized seatbelt pretensioners for occupants in the second row seating.

In block 88, the passive safety controller 22 deploys side curtain airbags to protect occupants seated in the second row. A single side curtain airbag may cover both first and second row seats and offer side impact protection to upper body regions of occupants seated in first and second rows.

Figure 6:
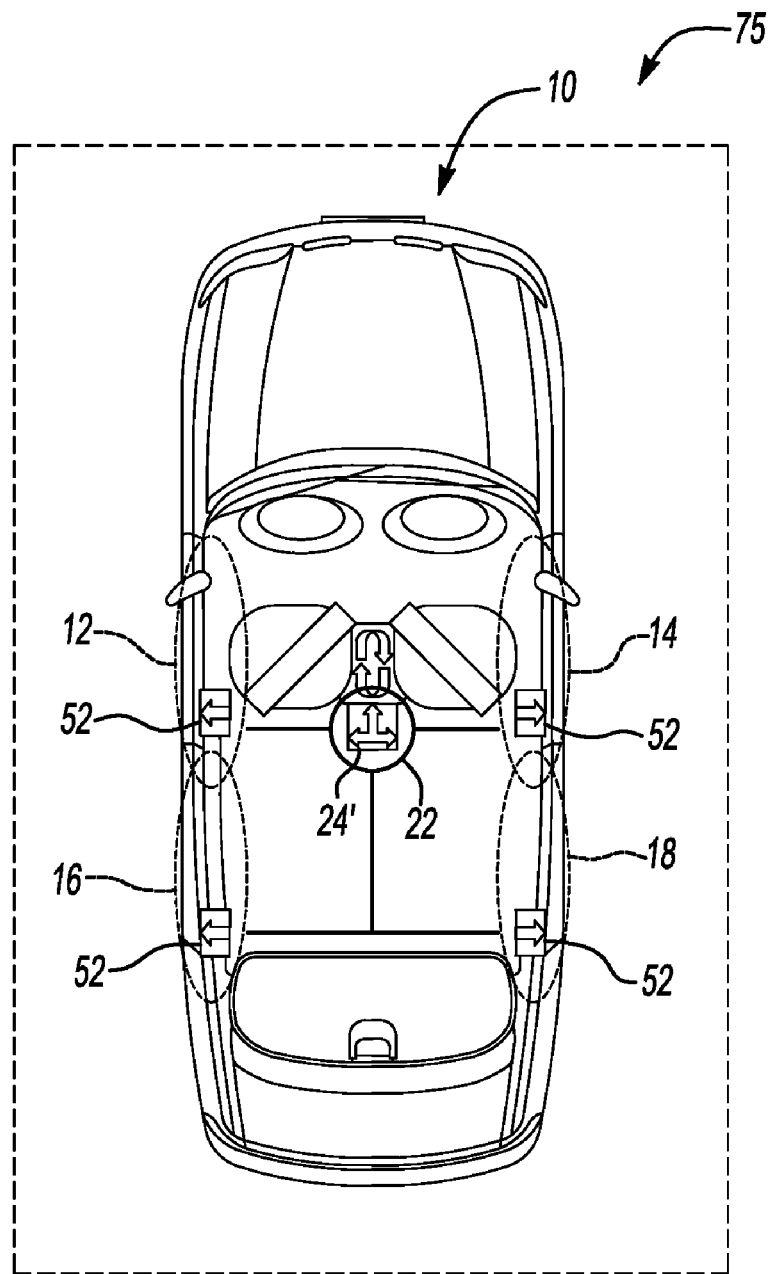
FIG. 6 depicts a system for detecting side impacts for a vehicle in accordance to another embodiment of the present invention.

FIG. 6 depicts a system 75 for detecting side impacts for a vehicle in accordance to another embodiment of the present invention. The system 75 generally includes the zones 12, 14, 16 and 18 as noted in connection with the system 50. The zones 12, 14, 16 and 18 generally include the crash signature sensor 52. The system 75 may operate in a similar manner as described by the diagram 70 with the exception of the pressure sensor positioned at zones 12 and 14. Blocks 74, 76, 78 and 82 use measured crash signature values instead of measured pressure values from the pressure sensors 26 where applicable.

While the best mode for carrying out the invention has been described in detail, those familiar with the art to which this invention relates will recognize various alternative designs and embodiments for practicing the invention as defined by the following claims.

What is claimed:

1. A system for performing side impact sensing in a vehicle including a side impact zone, the system comprising:
    a crash signature sensor positioned in the side impact zone, wherein the side impact zone is a part of a vehicle side structure that is disposed about at least one of a first row occupant seating arrangement and a second row seating arrangement of the vehicle, the crash signature sensor is configured to:
        detect an impact with an object at the side impact zone; and
        generate a crash signature signal which corresponds to measured structural impact energy of the vehicle in the side impact zone deformed by the impact at frequencies above 2 kHz; and
    a controller including an accelerometer sensor positioned therein that is configured to generate an accelerometer signal in response to the object impacting the side impact zone, the controller being configured to perform a plausibility check with the crash signature signal and the accelerometer signal and to deploy one or more safety restraints if the crash signature signal and the accelerometer signal exceeds a first predetermined threshold and a second predetermined threshold, respectively.

2. The system of claim 1 wherein the crash signature signal further corresponds to measured structural impact energy of the vehicle in the side impact zone deformed by the impact at a frequency range between 2 kHz and 20 kHz.

3. The system of claim 1 further comprising at least one pressure sensor positioned about a B pillar of the vehicle to generate at least one pressure signal indicative of the vehicle experiencing an impact at the side impact zone disposed about the first row occupant seating arrangement.

4. The system of claim 3 wherein the crash signature sensor is positioned about a C pillar of the vehicle and configured to generate the crash signature signal in response to the vehicle experiencing an impact at the side impact zone disposed about the second row occupant seating arrangement.

5. The system of claim 1 wherein the crash signature sensor is positioned about at least one of a B pillar and a C pillar of the vehicle and configured to generate the crash signature signal in response to the vehicle experiencing an impact in the side impact zone disposed about the at least one of the first and the second row occupant seating arrangements.

6. A method for performing side impact sensing in a vehicle, the vehicle includes a side impact zone, the method comprising:
    positioning a crash signature sensor in the side impact zone, wherein the side impact zone is part of a vehicle side structure that is disposed about at least one of a first row occupant seating arrangement and a second row occupant seating arrangement of the vehicle;
    detecting an impact at the side impact zone with the crash signature sensor;
    generating a crash signature signal which corresponds to measured structural impact energy of the vehicle in the impact zone deformed by the impact at frequencies above 2 kHz with the crash signature sensor;
    generating an accelerometer signal in response to the object impacting the side impact zone, the accelerometer signal being generated by an accelerometer sensor positioned within a controller; and
    performing a plausibility check with the crash signature signal and the accelerometer signal; and
    deploying one or more safety restraints if the crash signature signal and the accelerometer signal exceeds a first predetermined threshold and a second predetermined threshold, respectively.

7. The method of claim 6 wherein the crash signature signal further corresponds to measured structural impact energy of the vehicle in the side impact zone deformed by the impact at frequencies in a range between 2 kHz and 20 kHz.

8. The method of claim 6 further comprising positioning a pressure sensor about a B pillar of the vehicle to generate a pressure signal indicative of the vehicle experiencing an impact at the side impact zone disposed about the first row occupant seating arrangement of the vehicle.

9. The method of claim 8 wherein positioning the crash signature sensor further comprises positioning the crash signature sensor about a C pillar of the vehicle to generate the crash signature signal in response to the vehicle experiencing an impact in the at least one side impact zone disposed about the second row occupant seating arrangement of the vehicle.

10. The method of claim 6 wherein positioning the crash signature sensor further comprises positioning the crash signature sensor about at least one of a B pillar and a C pillar of the vehicle to generate the crash signature signal in response to the vehicle experiencing an impact at the side impact zone disposed about the at least one of the first and the second row occupant seating arrangements.

11. An assembly for detecting a side impact in a vehicle, the assembly comprising:
  a crash signature sensor positioned in a side impact zone, wherein the side impact zone is a part of a vehicle side structure that is disposed about at least one of a first row occupant seating arrangement and a second row seating arrangement, the crash signature sensor being configured to:
    detect impact with an object in the side impact zone disposed about the at least one first and second row occupant seating arrangements of the vehicle; and
    transmit the crash signature signal that corresponds to measured structural impact energy at frequencies above 2 kHz, the crash signature signal being transmitted in response to detecting the impact with the object in the side impact zone; and
  a controller being configured to:
    receive an accelerometer signal from an accelerometer sensor positioned therein in response to the impact with the object in the side impact zone;
    perform a plausibility check with the crash signature signal and the accelerometer signal; and
    deploy one or more safety restraints if the crash signature signal and the accelerometer signal exceeds a first predetermined threshold and a second predetermined threshold, respectively.

12. The assembly of claim 11 wherein the crash signature signal further corresponds to measured structural impact energy of the vehicle in the side impact zone deformed by the impact at frequencies in a range between 2 kHz and 20 kHz.

13. The assembly of claim 11 further comprising a pressure sensor positioned about a B pillar of the vehicle and configured to generate a pressure signal indicative of the vehicle experiencing an impact at the side impact zone disposed about the first row occupant seating arrangement.

14. The assembly of claim 13 wherein the crash signature sensor is positioned about a C pillar of the vehicle and is configured to generate the crash signature signal in response to the vehicle experiencing an impact at the side impact zone disposed about the second row occupant seating arrangement.

15. The assembly of claim 11 wherein the crash signature sensor is positioned about at least one of a B pillar and a C pillar of the vehicle to generate the crash signature signal in response to the vehicle experiencing an impact at the side impact zone disposed about the at least one of the first and the second row occupant seating arrangements.

* * * * *